Nov. 2, 1954 A. A. HEJDUK 2,693,113
PRESSURE AND TEMPERATURE COMPENSATING SCALE FOR MANOMETERS
Filed Nov. 21, 1950 2 Sheets-Sheet 2

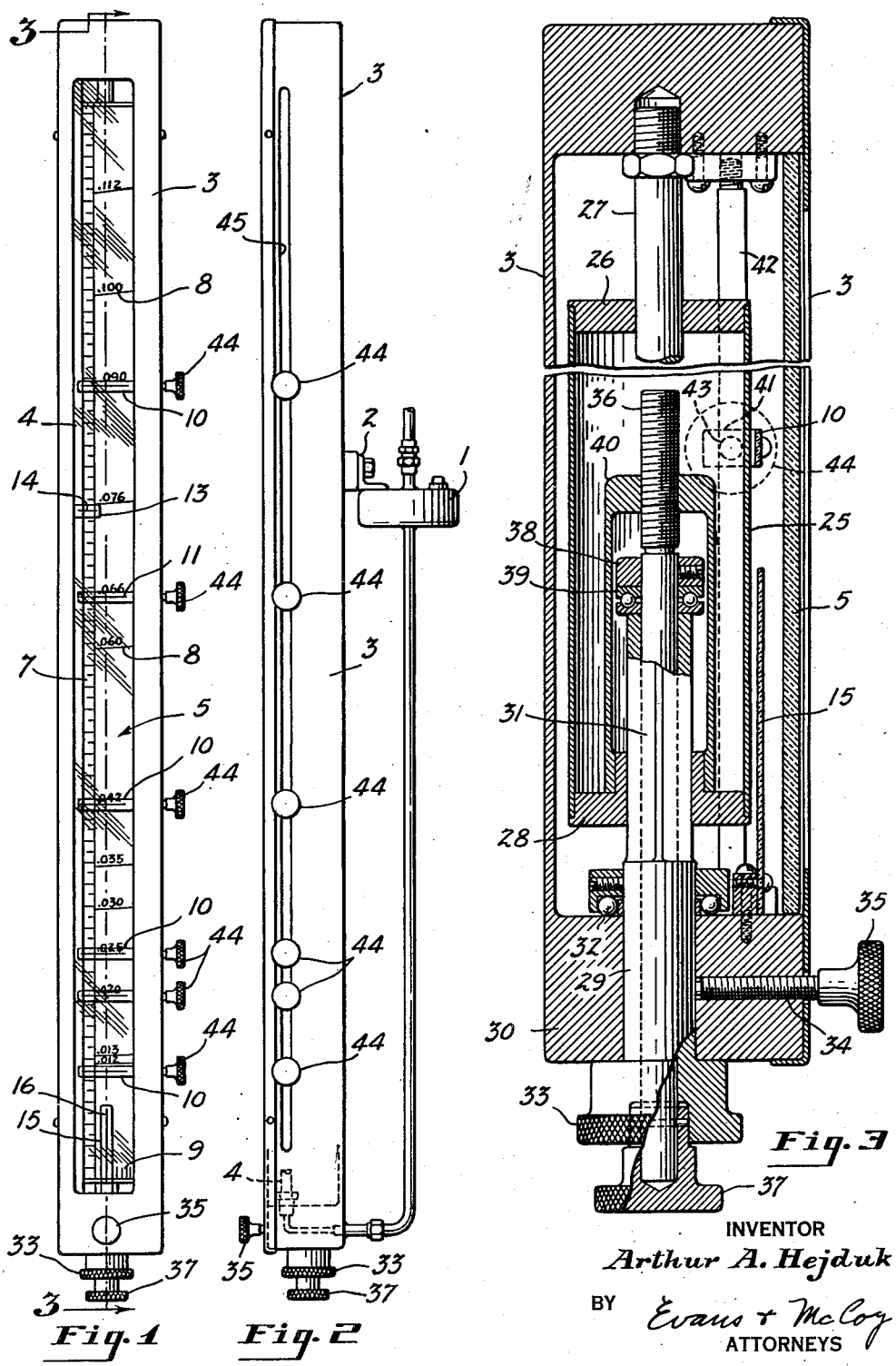

INVENTOR
Arthur A. Hejduk
BY Evans + McCoy
ATTORNEYS

United States Patent Office 2,693,113
Patented Nov. 2, 1954

2,693,113

PRESSURE AND TEMPERATURE COMPENSATING SCALE FOR MANOMETERS

Arthur Alfred Hejduk, Cleveland, Ohio, assignor to The Merriam Instrument Company, Cleveland, Ohio, a corporation of Ohio Application November 21, 1950, Serial No. 196,864

4 Claims. (Cl. 73—393)

This invention relates to manometer scales and particularly to an adjustable scale designed to facilitate the artificial production of various desired atmospheric conditions in apparatus for testing pressure sensitive instruments or mechanisms such for example as used for controlling the delivery of air to aircraft engines.

In testing such pressure sensitive mechanisms it is common practice to subject the device being tested to a series of different artificially produced atmospheric conditions simulating those to which the device is subjected in service employing a manometer to register successive pressures to which the mechanism is subjected. Where density of the atmosphere is an important factor it is necessary to correct manometer readings to compensate for variations in the barometric pressure of the atmosphere and also for variations in the temperature of the atmosphere.

My Patent 2,335,671, granted November 30, 1943, discloses a manometer provided with a scale which is adjustable longitudinally of the liquid column to provide absolute pressure readings for various barometric pressures.

In making tests such as above referred to, it has been found necessary to provide corrections for variations in the temperature of the fluid medium to which the device undergoing tests is being subjected, in addition to the corrections for variations in barometric pressure. Since the correction for temperature is different for different pressures, accurate correction for temperature variations cannot be obtained by longitudinal adjustment of a manometer scale, and it has heretofore been common practice to provide temperature correction charts showing corrected manometer readings for each of the series of atmospheric conditions to which the device being tested is subjected.

The present invention provides a scale which is longitudinally adjustable relative to the liquid column of the manometer to compensate for barometric variations and which is laterally adjustable in every position of longitudinal adjustment, the scale being provided with differentially inclined graduations, which upon lateral adjustment of the scale relative to the liquid column, provide readings which are corrected for temperature variations.

The invention has for its object to provide a manometer with a graduated scale which by easily effected adjustments with respect to the liquid column of the manometer provides readings corrected both for the prevailing barometric pressure and the prevailing atmospheric temperature.

Reference should be had to the accompanying drawings forming a part of this specification in which:

Figure 1 is a front elevation of the manometer embodying the invention;

Fig. 2 is a side elevation of the manometer shown in Fig. 1;

Fig. 3 is a foreshortened longitudinal section on an enlarged scale taken on the line indicated at 3—3 in Fig. 1;

Figure 6:
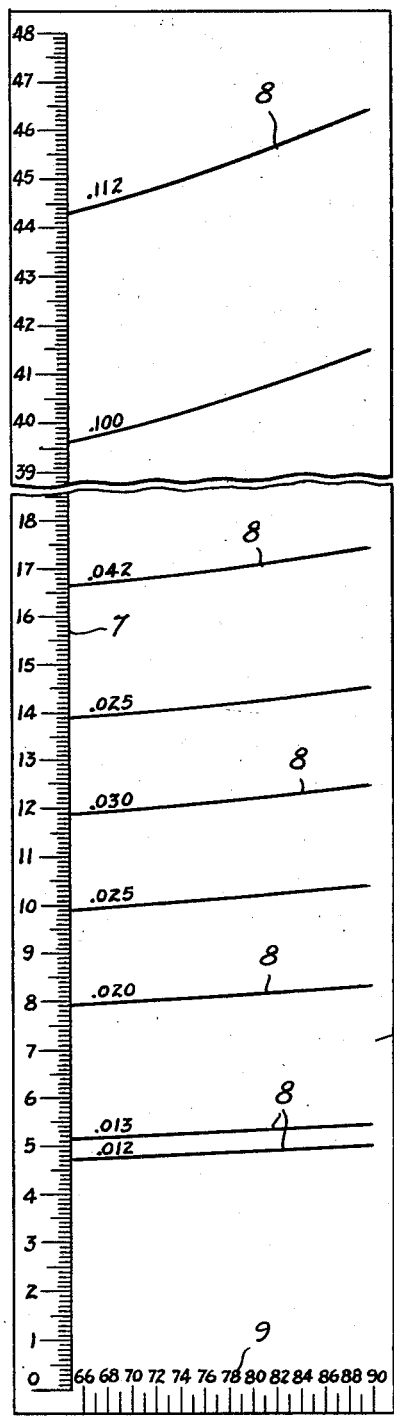
Fig. 6 is a developed plan view of the scale.
Figure 4:
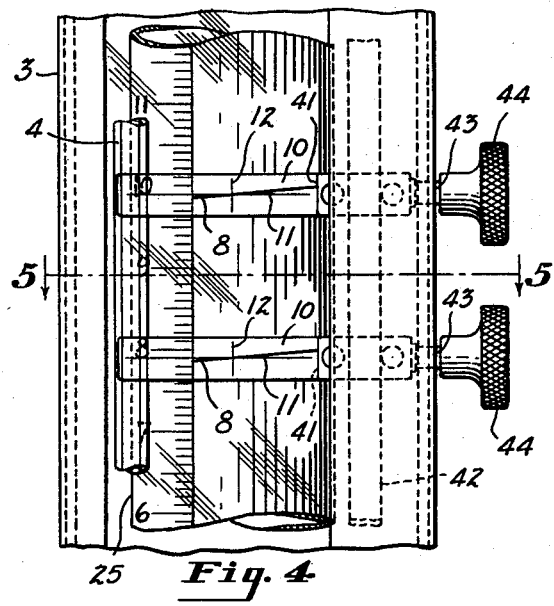
Fig. 4 is a fragmentary front elevation showing two of a series of indicators that are employed for indicating a series of liquid column levels for a predetermined series of testing operations.

The device of the present invention is applied to a manometer of the well type. As shown in Fig. 2 of the drawings, a liquid reservoir or well 1 is attached by means of a bracket 2 to the back wall of an elongated housing 3 within which a tube 4 containing the pressure indicating liquid column is mounted. The tube 4 extends substantially throughout the length of the housing and the housing is provided with a window 5 through which the tube 4 and an associated scale 6 are exposed to view. The scale has a longitudinal row of graduations 7 which may be spaced to indicate inches and fractions thereof and it is also provided at intervals along its length with additional transversely extending graduations 8 which are differentially inclined in such manner as to provide deviations from the horizontal which will indicate the corrections necessary for various temperatures at various pressures. At its lower end the scale is provided with laterally and circumferentially spaced graduations 9 which indicate a series of temperatures.

Distributed along the length of the window 5 are a series of adjustable indicators 10 each in the form of a transparent plate extending across the window opening and having a horizontal line 11 for alinement with the top of the liquid column, and a vertical line 12 intersecting the line 11 to indicate a reading point.

Opposite the well 1 the housing 3 is provided with a fixed indicator 13 in the form of a transparent plate overlying the tube 4 and a portion of the scale 6, and having a horizontal line 14. The line 14 on the indicator 13 provides a gauge for indicating a level to which the liquid should be filled in the well 1 and also provides a reading on the scale 6 showing the adjustment of the scale with respect to the tube 4. In front of the lower end of the scale 6 the housing 3 is provided with a fixed indicator 15 in the form of a transparent plate provided with a vertical line 16 which in connection with the graduations 9 serves to indicate the position of lateral adjustment of the scale 6.

In the operation of the device the scale is adjusted vertically to bring the barometer reading on the scale 6 in alinement with the line 14 of the indicator 13, after which the scale 6 is adjusted laterally with respect to the tube 4 to bring the graduation 9 corresponding to the prevailing temperature of the atmosphere in alinement with the line 16 of the indicator 15. By adjusting the reading points of the various indicators 10 to alinement with selected graduations 8, a series of levels for the liquid column in the tube 4 are indicated and, in testing a pressure mechanism to determine its action under the various atmospheric conditions indicated, the manometer well is connected to the testing apparatus and to pressure varying means in such manner that a series of pressures may be produced which will bring the liquid level into registry successively with the various cross line indicators 10.

Figure 7:
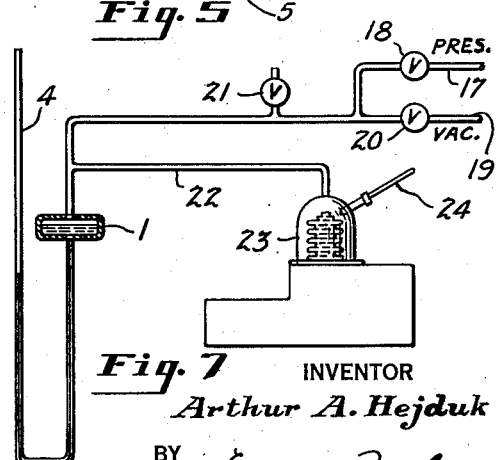
Fig. 7 is a diagrammatic view showing one way in which the manometer of the present invention may be used in testing a pressure sensitive mechanism.

As shown in Fig. 7 of the drawings, the well 1 of the manometer is connected to a pressure line 17 through a control valve 18 and to a vacuum line 19 through a control valve 20. A vent valve 21 is also provided by means of which pressures in the well 1 above atmospheric may be gradually lowered to atmospheric pressure.

The manometer well 1 is connected by a branch line 22 to a suitable pressure chamber 23 designed to receive the particular instrument or mechanism to be tested, and the chamber 23 may be provided with a suitable thermometer 24 to show the temperature of the fluid medium to which the instrument under test is being subjected.

The various graduations 8 to which the indicators 10 may be adjusted may represent pressures at various predetermined altitudes and, with the scale adjusted to the temperature reading indicated by the thermometer 24, the cross lines 11 of the indicators may be readily positioned at the proper heights for the series of testing operations.

As herein shown the scale 6 is upon the external surface of an elongated cylinder 25 mounted within the housing 3 alongside the tube 4. The cylinder 25 is disposed with its axis parallel to the tube 4 and is provided at its upper end with a disk 26 which slidably and rotatably fits upon a stub shaft 27 secured in fixed position to the upper end of the housing 3. The cylinder 25 has a disk 26 at its lower end which slidably fits on a tubular stub shaft 29 axially alined with the stub shaft 27 and journaled in the lower wall 30 of the housing. The cylinder 25 is slidable but not rotatable on the stub shaft 29 which has a square upper end portion 31 which fits in a similarly shaped opening in a disk 28. The stub shaft 29 is held against endwise movement in the wall 30 by a ball thrust bearing 32 engaging the top face of the wall and a handwheel 33 formed by an enlargement of the shaft and adapted to bear against the bottom of the wall 30. By means of the handwheel 33 the cylinder 25 may be turned to move the graduations 9 laterally with respect to the indicator 15 and to bring the desired temperature indicating graduations 9 into alinement with the line 16 of the indicator 15.

The stub shaft 29 is locked in adjusted positions by means of a screw 34 threaded in the bottom wall 30 of the housing and having a thumb wheel head 35 by means of which it may be tightened against the shaft 29 to lock the shaft against turning movements. A screw 36 is pournaled in the tubular stub shaft 29 and projects beyond the upper and lower ends thereof. At its lower end below the lower end of the shaft 29 the screw 36 has a handwheel 37 by means of which it can be turned and above the upper end of the stub shaft 29 a collar 38 is attached to the screw 36 and a ball thrust bearing 39 is interposed between the collar 38 and the upper end of the shaft 29. The upper end of the screw 36 has threaded engagement with the upper end of a cup-shaped member 40 that is fixed at its lower end to the disk 28. By turning the screw 36 the cylinder 25 may be adjusted vertically to provide the correct readings on the scale fixed for any barometric pressure. By turning the stub shaft 29 the scale 6 may be properly positioned to provide corrections for variations in temperature.

Figure 5:
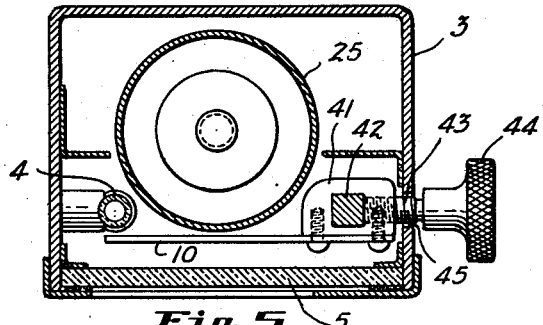
Fig. 5 is a transverse section taken on the line indicated at 5—5 in Fig. 4.

As shown in Figs. 3 and 5, each of the indicators 10 is attached to a slide 41 mounted for vertical movement on a vertical rod 42 extending from the top to the bottom of the housing adjacent the side wall thereof opposite the side upon which the tube 4 is mounted. The rod 42 is a square rod upon which the slides 41 have a sliding fit to maintain the indicators 10 in proper positions with respect to the scale 6 and tube 4. Each of the slides 41 is provided with a locking screw 43 provided with a thumb wheel head 44 by means of which it may be turned to clamp the slide in adjusted position to the rod 42. Each of the screws 43 serves as a handle for raising and lowering its slide and these screws extend through a longitudinal slot 45 in the adjacent side wall of the housing 3.

It is to be understood that variations and modifications of the specific devices herein shown and described for purposes of illustration, may be made without departing from the spirit of the invention.

What I claim is:

1. In a well type manometer having a liquid column, a scale extending longitudinally of the column and having longitudinally spaced pressure indicating graduations and laterally spaced graduations for indicating temperatures, certain of said longitudinally spaced graduations being in the form of temperature compensation curves, means for adjusting said scale longitudinally and laterally with respect to said column, means for indicating the positions of lateral and longitudinal adjustment of the scale with respect to the column, and a series of longitudinally adjustable cross line indicators overlying the scale and column and each having a reading point indicated thereon, whereby a series of column levels may be indicated for a series of successive testing operations.

2. In a manometer of the well type having a pressure indicating liquid column, a housing having a longitudinal window through which said column is visible, longitudinally spaced axially alined stub shafts mounted in said housing, one of said shafts being tubular and extending through an end of said housing, a scale cylinder alongside said liquid column having one end slidably and non-rotatably mounted on said tubular shaft and its opposite end slidably and rotatably mounted on the other of said shafts, releasable means for holding said tubular shaft against turning movements, a screw extending through said tubular shaft and having threaded engagement with said cylinder, thrust bearings holding said tubular shaft against endwise movement in the housing and said screw against endwise movement in said tubular shaft, and handwheels on said tubular shaft and said screw exteriorly of the housing.

3. A manometer for facilitating the creation of various fluid pressures for testing purposes that have predetermined corrections for temperature comprising an upright pressure indicating liquid column adapted to be subjected to the created pressure, a scale alongside said column having horizontally spaced temperature indicating graduations and vertically spaced pressure indicating graduations that extend past a series of temperature graduations and that are differentially inclined with respect to said column, means for adjusting said scale laterally with respect to said column and for securing the same in adjusted positions, means for indicating the position of lateral adjustment of said scale with respect to said column, and an indicator mounted for adjustment longitudinally of said scale and said column that has a horizontal cross line overlying the scale and column and that is provided with means for indicating a reading point on said line at a fixed distance laterally of said column, whereby said indicator may be positioned with its reading point overlying a selected pressure graduation and with its cross line positioned to indicate the level of the top of the liquid column when the selected pressure corrected for the indicated temperature for which the scale is adjusted is applied thereto.

4. A manometer such as defined in claim 3 in which the scale is adjustable longitudinally relative to the pressure indicating column to compensate variations in barometric pressure and in which the scale is adjustable laterally with respect to said column in any position of longitudinal adjustment thereof.

References Cited in the file of this patent

UNITED STATES PATENTS

| Number | Name | Date |
|---|---|---|
| 1,248,698 | Murray | Dec. 4, 1917 |
| 1,867,216 | Forney | July 12, 1932 |
| 2,335,671 | Hejduk | Nov. 30, 1943 |

FOREIGN PATENTS

| Number | Country | Date |
|---|---|---|
| 445,626 | Great Britain | Apr. 16, 1936 |